US011336273B1

(12) United States Patent
Finkelshtein et al.

(10) Patent No.: US 11,336,273 B1
(45) Date of Patent: May 17, 2022

(54) PROTECTION AGAINST ATTACKS ON INTEGRATED CIRCUITS USING VOLTAGE MONITORING

(71) Applicant: MELLANOX TECHNOLOGIES, LTD., Yokneam (IL)

(72) Inventors: Dotan Finkelshtein, Yokneam Illit (IL); Aviv Hasson, Tel Aviv-Jaffa (IL); Yaniv Strassberg, Yokneam (IL); Ran Sela, Givat Shmuel (IL)

(73) Assignee: MELLANOX TECHNOLOGIES, LTD., Yokneam (IL)

( * ) Notice: Subject to any disclaimer, the term of this patent is extended or adjusted under 35 U.S.C. 154(b) by 0 days.

(21) Appl. No.: 17/464,703

(22) Filed: Sep. 2, 2021

(51) Int. Cl.
| | |
|---|---|
| H03K 5/08 | (2006.01) |
| H03K 5/1252 | (2006.01) |
| G01R 19/165 | (2006.01) |
| G06F 21/75 | (2013.01) |
| G06F 21/55 | (2013.01) |
| G06F 1/28 | (2006.01) |

(52) U.S. Cl.
CPC ..... *H03K 5/1252* (2013.01); *G01R 19/16533* (2013.01); *G01R 19/16566* (2013.01); *G06F 1/28* (2013.01); *G06F 21/554* (2013.01); *G06F 21/755* (2017.08)

(58) Field of Classification Search
CPC combination set(s) only.
See application file for complete search history.

(56) References Cited

U.S. PATENT DOCUMENTS

| | | | |
|---|---|---|---|
| 7,085,979 B2 * | 8/2006 | Kim | G06K 19/073 714/733 |
| 10,990,682 B2 | 4/2021 | Margalit | |
| 2021/0148957 A1 * | 5/2021 | Tuncer | H03K 5/00 |

OTHER PUBLICATIONS

Invia, "How a Voltage Glitch Attack could Cripple your SoC or MCU—and How to Securely Protect it", Application Note, rev. 1.0, pp. 1-3, Jun. 30, 2020.
Kleeman et al., "Metastable Behavior in Digital Systems", IEEE Design & Test of Computers, vol. 4, issue 6, pp. 4-19, Dec. 1987.

* cited by examiner

*Primary Examiner* — Long Nguyen
(74) *Attorney, Agent, or Firm* — Kligler & Associates Patent Attorneys Ltd (57) ABSTRACT

An Integrated Circuit (IC) includes functional circuitry and attack-protection circuitry (APC). The functional circuitry is to receive a supply voltage from a power-supply input. The APC is coupled to the power-supply input and includes a front-end circuit and an averaging circuit. The front-end circuit is to compare the supply voltage to a plurality of voltage thresholds, and to output a respective plurality of indications that indicate whether the supply voltage violates the respective voltage thresholds. The averaging circuit is to estimate, for a selected subset of the indications, respective duty-cycles at which the indications in the subset exceed the respective voltage thresholds. The APC is to trigger one or more attack detection events in response to the indications and the duty-cycles.

17 Claims, 6 Drawing Sheets

PROTECTION AGAINST ATTACKS ON INTEGRATED CIRCUITS USING VOLTAGE MONITORING

FIELD OF THE INVENTION

The present invention relates generally to integrated circuit security, and particularly to methods and systems for protecting an integrated circuit against security attacks.

BACKGROUND OF THE INVENTION

Integrated circuits (ICs) are sometimes attacked by hackers, to extract confidential information (e.g., security keys).

In "How a voltage glitch attack could cripple your SoC or MCU," INVIA Application Note—rev 1.0—Jun. 30, 2020, the author explains that voltage glitching is a simple, cheap way for hackers and criminals to perform fault injection exploits on any accessible device and suggests a layered security protection, comprising a combination of fast, reliable detection of transient voltage events on the target device's power supply, and redundant hardware and software to ensure the system is resilient to attack, and then proceed to describe the specifics of a voltage-glitch-protection intellectual property.

U.S. Patent Application Publication 2021/0148957 discloses circuitry to detect voltage-based attacks on an integrated circuit in the presence of clock jitter, where propagating signals can exhibit a total delay that is due to a delay component resulting from a voltage-based attack and a delay characteristic resulting from clock fluctuation. A voltage-variation detection circuitry includes first and second voltage-dependent circuits and a voltage analysis circuit. The voltage-dependent circuits produce first and second signals that are indicative of a voltage level responsive to a clock signal and based on different first and second voltage sensitivities. The voltage analysis circuit generates a voltage alert signal based on the first and second signals. A combined signal neutralizes the delay characteristic in the first and second signals, but the delay component due to the voltage variation can be at least partially maintained. Thus, a voltage-based attack is detectable in the presence of clock fluctuation by using two voltage-dependent circuits.

SUMMARY OF THE INVENTION

An embodiment of the present invention that is described herein provides an Integrated Circuit (IC) including functional circuitry and attack-protection circuitry (APC). The functional circuitry is to receive a supply voltage from a power-supply input. The APC is coupled to the power-supply input and includes a front-end circuit and an averaging circuit. The front-end circuit is to compare the supply voltage to a plurality of voltage thresholds, and to output a respective plurality of indications that indicate whether the supply voltage violates the respective voltage thresholds. The averaging circuit is to estimate, for a selected subset of the indications, respective duty-cycles at which the indications in the subset exceed the respective voltage thresholds. The APC is to trigger one or more attack detection events in response to the indications and the duty-cycles.

In some embodiments, the front-end circuit is an analog circuit, and the averaging circuit is a digital circuit. In some embodiments, the APC is to latch the one or more attack detection events. In an embodiment, the voltage thresholds include at least two different over-voltage thresholds. Additionally or alternatively, the voltage thresholds include at least two different under-voltage thresholds.

In a disclosed embodiment, the APC is to compare at least one of the duty cycles to a duty-cycle threshold, and to trigger an attack detection event in response to detecting that the duty-cycle threshold is exceeded. In an example embodiment, the APC is to trigger at least one of the attack detection events irrespective of whether a clock signal of the IC is operative. In an embodiment, the front-end circuit includes a resistor network for generating the plurality of voltage thresholds.

There is additionally provided, in accordance with an embodiment of the present invention, a method for protecting an Integrated Circuit (IC). The method includes, using a front-end circuit, comparing a supply voltage, which is supplied to functional circuitry of the IC, to a plurality of voltage thresholds, and outputting a respective plurality of indications that indicate whether the supply voltage violates the respective voltage thresholds. Using an averaging circuit, for a selected subset of the indications, duty-cycles at which the indications in the subset exceed the respective voltage thresholds are estimated. One or more attack detection events are triggered in response to the indications and the duty-cycles.

There is also provided, in accordance with an embodiment of the present invention, a method for protecting an Integrated Circuit (IC). The method includes comparing a supply voltage supplied to functional circuitry of the IC to a plurality of voltage thresholds. A respective plurality of indications, which indicate whether the supply voltage violates the respective voltage thresholds, are output. For a selected subset of the indications, respective duty-cycles at which the indications in the subset exceed the respective voltage thresholds are estimated. One or more attack detection events are triggered in response to the indications and the duty-cycles.

The present invention will be more fully understood from the following detailed description of the embodiments thereof, taken together with the drawings in which:

DETAILED DESCRIPTION OF EMBODIMENTS

Overview

One of the more common security attacks on Integrated Circuits (ICs) is the application of glitches on the power supply inputs and/or the clock inputs of the IC, with the hope that a metastable state will occur, compromising the built-in security functions of the IC.

We will refer to persons who attack an IC for maliciously accessing unauthorized data as Hackers. Four types of voltage attacks are typically applied by hackers:

1. A high-voltage spike attack, in which the hacker applies a single high-voltage spike on a power supply input of the IC, wherein the voltage spike is substantially higher than the maximum specifications of the IC.

2. A low-voltage spike attack, in which the hacker applies a single low-voltage spike on a power supply input of the IC, wherein the voltage spike is substantially below the minimum specifications of the IC.

3. A high average voltage attack, in which a high duty-cycle train of pulses is applied to the supply input, wherein in each pulse the voltage is above the maximum supply-voltage specification.

4. A low average voltage attack, in which a high duty-cycle train of pulses is applied to the supply input, wherein in each pulse the voltage is below the minimum supply-voltage specification.

The four types of voltage attacks described above may be combined with frequency attacks, that apply substantial noise on the clock input of the IC.

Embodiments of the present invention that are disclosed herein provide ICs that are protected at least against the four types of voltage attacks, combined with frequency attacks. In embodiments, the IC comprises functional circuitry and attack protection circuitry (APC). In an embodiment, the APC comprises an analog domain circuit referred to as an analog front-end circuit, and a digital domain circuit referred to as a digital averaging circuit. The analog domain circuit comprises a set of reference voltages (threshold voltages) and analog comparators, which compare the supply voltage to the series of threshold voltages and indicate, for each of the threshold voltages, whether the supply input voltage level is greater than or lower than the threshold voltage.

In some embodiments, the threshold voltages comprise a max-high-voltage-spike threshold, a high-average threshold, a low-average threshold and a min-low-voltage-spike threshold, that are coupled, respectively, to a max-spike comparator, an average-high comparator, an average-low comparator and a min-spike comparator. The comparators compare the supply voltage to the thresholds (in some embodiments, the comparators may compare a multiplication of the supply voltage by a preset factor (e.g., 0.5), to thresholds that adjusted accordingly).

In the present context, the supply voltage is referred to as "violating" a threshold when the supply voltage is above an over-voltage threshold (e.g., the max-high-voltage-spike threshold or the high-average threshold) or when the supply voltage is below an under-voltage threshold (e.g., the low-average threshold or the min-low-voltage-spike threshold).

In some embodiments, the analog circuitry of the APC further comprises latches operable to latch detected attacks. The latches are not clocked, and, hence, protected against combined voltage-spike—frequency attacks.

In an embodiment, the digital circuitry of the APC comprises averaging circuits that receive indications from corresponding comparators of the analog circuitry that an average-high or an average-low attack may be in progress, average the output of the comparators over time and indicate if the average is beyond a preset (digital) threshold.

In some embodiments, if the APC detects an attack, the APC forces the functional circuitry to a safe state; for example, in an embodiment, the APC may reset some or all the flops of the functional circuitry.

System Description

The embodiments disclosed herein refer to the protection of an integrated circuit (IC) from voltage and/or frequency attacks. The disclosed techniques, however, can also be used for the protection of systems (e.g., a Multi-Chip Module, or MCM).

Figure 1:
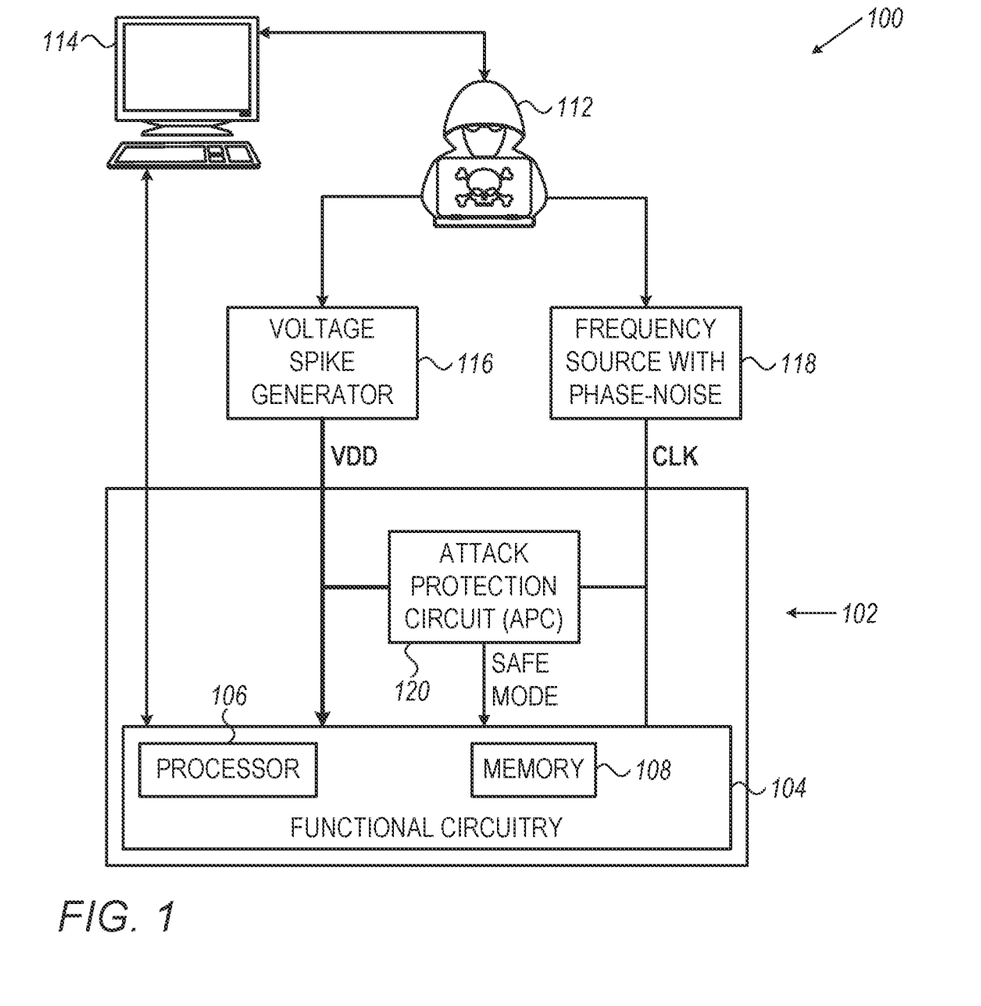
FIG. 1 is a block diagram that schematically illustrates a voltage/frequency attack scenario on an Integrated-Circuit (IC) having an Attack Protection Circuit (APC), in accordance with an embodiment of the present invention.

FIG. 1 is a block diagram 100 that schematically illustrates a voltage/frequency attack scenario on an Integrated-Circuit (IC), in accordance with an embodiment of the present invention. An IC 102 comprises functional circuitry 104, which includes a processor 106 and a memory 108. Processor 106 may be any Central-Processing-Unit (GPU), Graphic-Processor Unit (GPU), a communication processor, or other types of processors (in an embodiment, processor 106 may comprise a plurality of processors of the same or of various types). The functional circuitry may comprise confidential information, stored, for example, in memory 108. Protection software and/or hardware within the functional circuitry allow access to the confidential information only if a predefined key is provided (e.g., by an authorized user).

A Hacker 112, communicating with the IC from a terminal 114, does not know the predefined key and endeavors to access the confidential information, by applying various attack techniques. According to the example embodiments illustrated in FIG. 1, hacker 112 connects a voltage-spike-generator 116 to the VDD supply voltage of IC 102, and a frequency source with programmable noise to the clock input of the IC. By applying spikes on the power supply and/or noise on the clock input, the hacker attempts to enter a metastable state in IC 100, which may result in the exposure of the confidential data to the hacker.

To mitigate such attacks, IC 102 further comprises an Attack-Protection Circuit (APC) 120, which is coupled to the supply input and to the clock input of the IC. The APC is configured to detect voltage attacks and combined voltage/frequency attacks, and to force a safe mode of the functional circuitry if an attack is detected (a safe mode may be, for example, a mode wherein memory access is limited, or, for another example, a mode wherein processor 106 is reset).

Thus, the APC may detect all voltage and voltage/frequency attacks, keeping the confidential information safe.

As would be appreciated, the voltage-frequency attack scenario 100, and the structure of IC 102, are examples that are depicted for the sake of clarity. In alternative embodiments, other suitable attack scenarios and IC structures may be used. For example, IC 102 may comprise a plurality of supply voltages, as well as a plurality of clock sources (in which case the hacker may attempt to attack some or all the voltage supplies, and APC 120 may be configured to protect against attacks in any or all supply and clock inputs). In an embodiment, IC 102 comprises other sub-units, e.g., a plurality of processors, a plurality of memories (of the same or of different types), communication controller, security engines, graphic processor units and others. In some embodiments, IC 102 does not connect to a terminal, and the hacker may monitor communication between the IC and external entities (e.g., a network).

Security Breach Example

When no security attacks are attempted, IC 102 is configured to restrict access to any stored confidential data. For example, IC 102 may run a computer program in which accessing of the confidential information can be reached only after running an authentication program (e.g., a program that queries the user for a password and then checks the password). In a more general observation, IC 102 can be viewed as a finite-state-machine (FSM), wherein the state in which protected data is accessed can be entered only if preceded by successful authentication states.

Figure 2A:
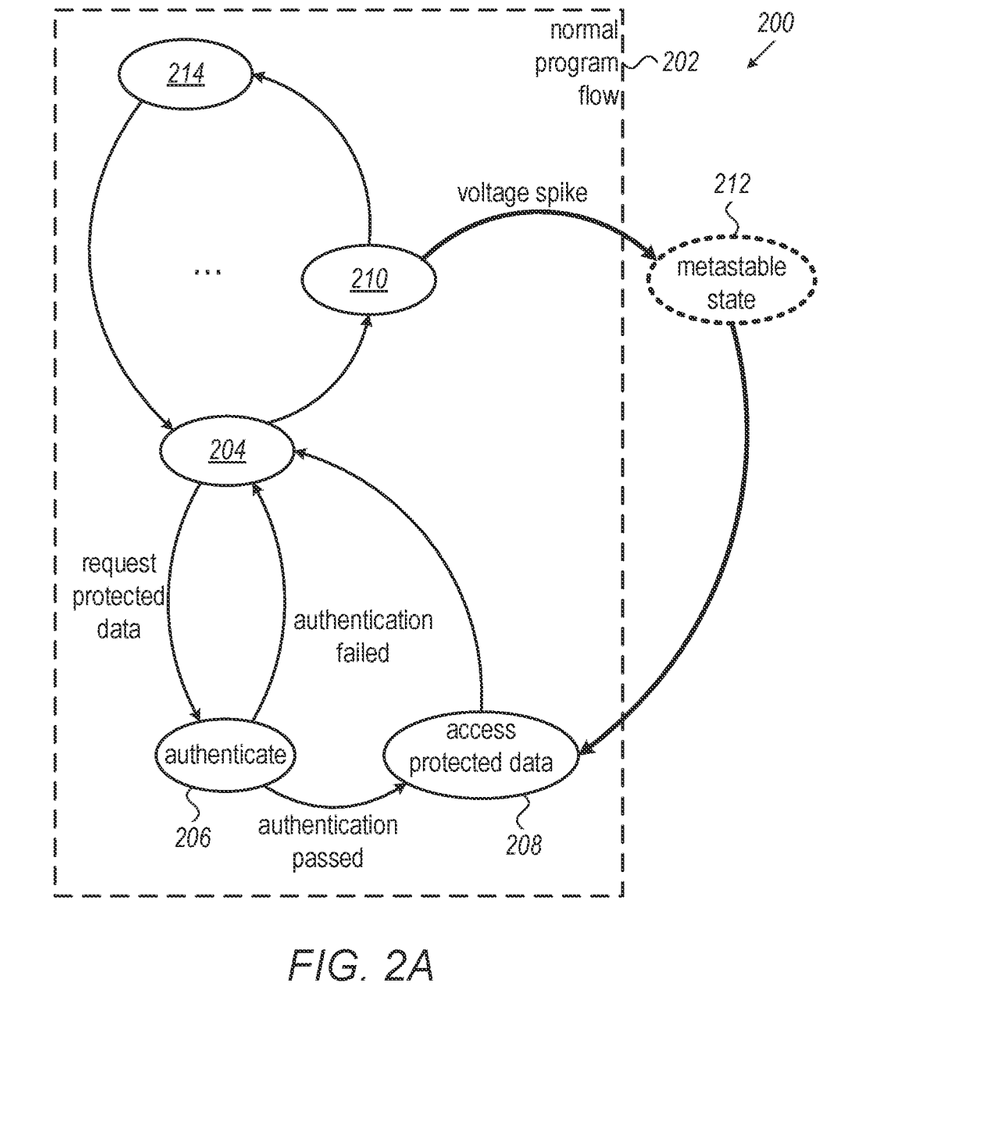
FIGS. 2A and 2B are state-transition diagrams that schematically illustrate the states of an IC when a security attack is applied, without and with attack prevention, respectively, in accordance with an embodiment of the present invention.

FIG. 2A is a state-transition diagram 200 that schematically illustrates the states of IC 102, while APC 120 is inactive when a security attack is applied, in accordance with an embodiment of the present invention. The state transition diagram comprises a normal program-flow set of states 202, which includes the designed states and the transitions between the states. According to the state transition diagram illustrated in FIG. 2A, a user may request to access protected data when the FSM is in a state 204; as a result, the FSM transitions to an Authenticate state 206 (Authenticate state 206 typically comprises a plurality of states, that are not shown, for the sake of clarity). If, in state 206, the authentication fails, the FSM transitions back to state 204; however, if the authentication is successful, the FSM transitions to an Access Protected Data state 208, exposes the protected data to the user, and then transitions back to state 204 (and from state 204 to other states of the normal program flow 202).

According to the state transition diagram illustrated in FIG. 2A, illegal states may occur if a voltage spike is applied at the input of functional circuitry 104. For example, while normally the FSM transitions from state 210 to a state 214, if a voltage spike is applied while the FSM is in a state 210, the FSM may enter a metastable state 212. (A tutorial on metastability in electronic systems can be found, for example, in "Metastable Behavior in Digital Systems," L. Kleeman et. al., IEEE Design & Test of Computers (Volume: 4, Issue: 6, December 1987), pages 4-16.) The behavior of the FSM following a metastable state may be unpredictable, and, in some cases, the FSM may enter Access Protected Data state 208, and read the protected data.

As would be appreciated, the state transition diagram 200 illustrated in FIG. 2A and described herein is an example that is cited for conceptual clarity. Other state transition diagrams may be used. For example, a plurality of metastable states may be entered if a voltage glitch occurs when the FSM is in the various normal-program-flow states, and the next state following the metastable states may be a substrate of state 208 that is entered after authentication (and is not shown).

Figure 2B:
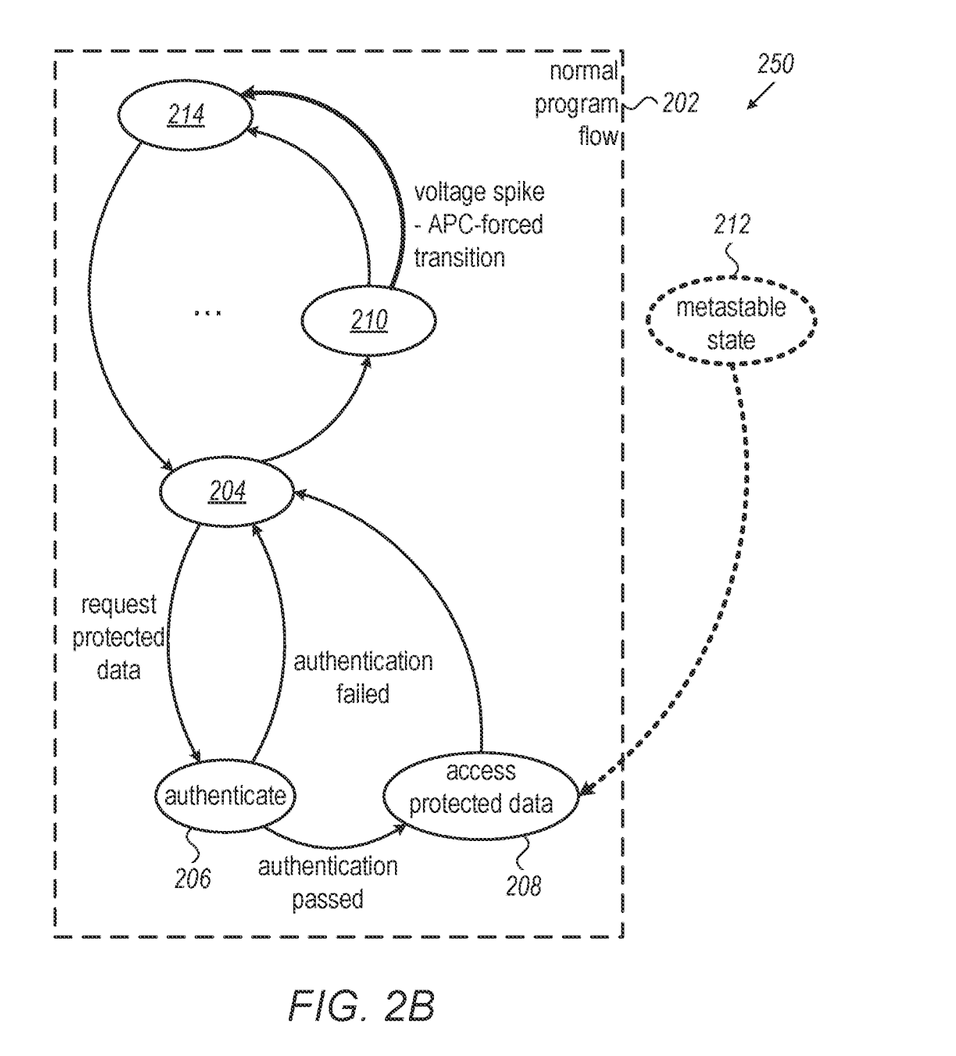

FIG. 2B is a state-transition diagram 250 that schematically illustrates the states of IC 102 with APC 120 active, in accordance with an embodiment of the present invention. The states of state-transition diagram 250 are identical to the states of state-transition diagram 200, and both FSMs comprise a metastable state 212, from which an unsecure transition to state 208 may occur; however, according to the example embodiment illustrated in FIG. 2B, any voltage attack will be detected by the APC, and, as a result, the FSM will transition to a state 214 (e.g., a Reset state). Thus, metastable state 212 cannot be reached, and the security of the protected data will not be breached.

As would be appreciated, state transition diagram 250 illustrated in FIG. 2B and described herein is an example embodiment which is cited for conceptual clarity. In alternative embodiments different state transition diagram may be used. For example, in some embodiments, following an attack indication generated by the APC, all states will unconditionally transition to a reset state.

Types of Voltage Attacks

A hacker may apply a voltage attack concurrently with a frequency attack. However, as, in most ICs, the main clocks are generated by an on-chip inherently slow-changing Phase-Locked-Loop (PLL), frequency attacks are typically limited to stopping of the clock or slowly changing the frequency. We will, therefore, concentrate below on the specifics of the different types of voltage attacks, which will be described with reference to FIG. 3.

Figure 3:
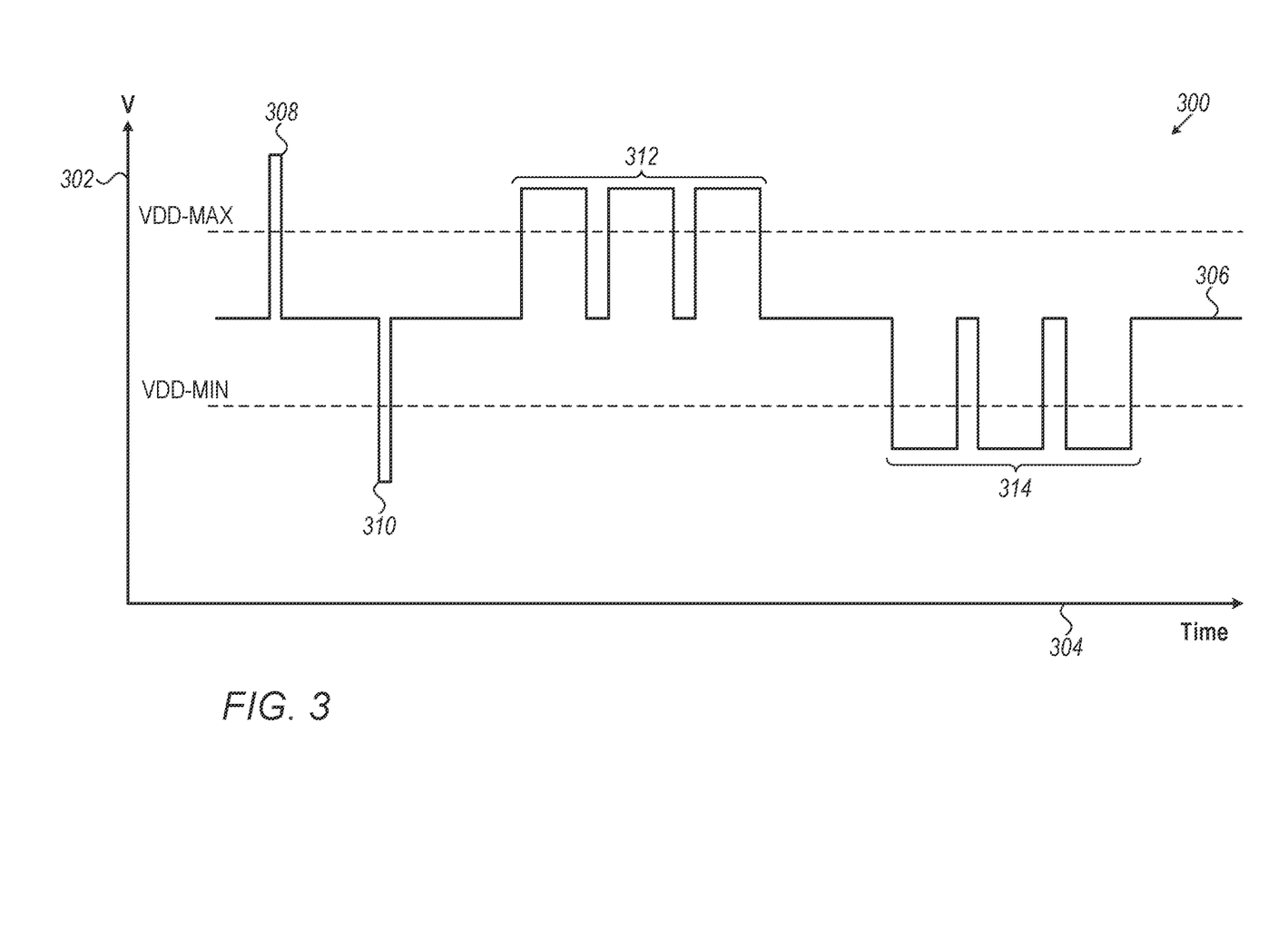
FIG. 3 is a timing diagram that schematically illustrates four types of voltage attacks applied to the IC and detected by an Attack Protection Circuit (APC), in accordance with an embodiment of the present invention.

FIG. 3 is a timing diagram 300 that schematically illustrates four types of voltage attacks applied to IC 102 and detected by the Attack Protection Circuit 120, in accordance with an embodiment of the present invention. The timing diagram comprises a vertical voltage axis 302 (designated V) and a horizontal Time axis 304. The diagram illustrates the voltage-time waveform 306 of the power supply input Vdd of IC 102. The figure also illustrates the normal minimum (VDD-MIN) and maximum (VDD-MAX) voltages that may be applied to the IC, according to the IC specifications.

A high-voltage spike attack 308 is first applied, wherein the supply voltage, for a short period of time, enters a level which is far larger than the maximum specifications. In some embodiment the voltage level applied at high-voltage-spike-attack 308 is high enough to permanently damage IC 102, if sustained for a long period of time. The purpose of the high-voltage-spike attack may be, for example, to make the Vol (output low voltages) of some flops higher than the Vih input of some gates, which will result in an illegal combination of inputs that may potentially lead to a metastable state.

Next, a low-voltage spike attack 310 is applied, wherein the supply voltage, for a short period of time, is set to a level that is substantially below the minimum Vdd specifications. This low supply voltage may cause some of the flops to lose data, and, when the Vdd is restored to normal, some of the flop may enter a metastable state.

In an Average-High attack 312, the IC supply input is applied with a continuous train of high voltage pulses. As each pulse is substantially higher than the maximum specification, the average-high attack may cause junctions in the IC to overheat and, potentially, cause some of the flops to reach a metastable state.

Next, in an Average-Low attack 314, the IC supply input is applied with a continuous train of low voltage pulses. Each pulse is substantially lower than the minimum Vdd specifications, and the train of pulses may cause more than one flop to enter a metastable state; the combination of flops entering metastable state may increase the odds that a protected state will be subsequently entered.

As would be appreciated, the voltage attack waveform illustrated in FIG. 3 is an example, cited for the sake of clarity. Voltage attack may comprise other waveforms in any order. The train of pulses typically do not have a constant duty cycle and/or equal pulse heights, and some or all the attacks may be applied in close proximity to each other.

Figure 4:
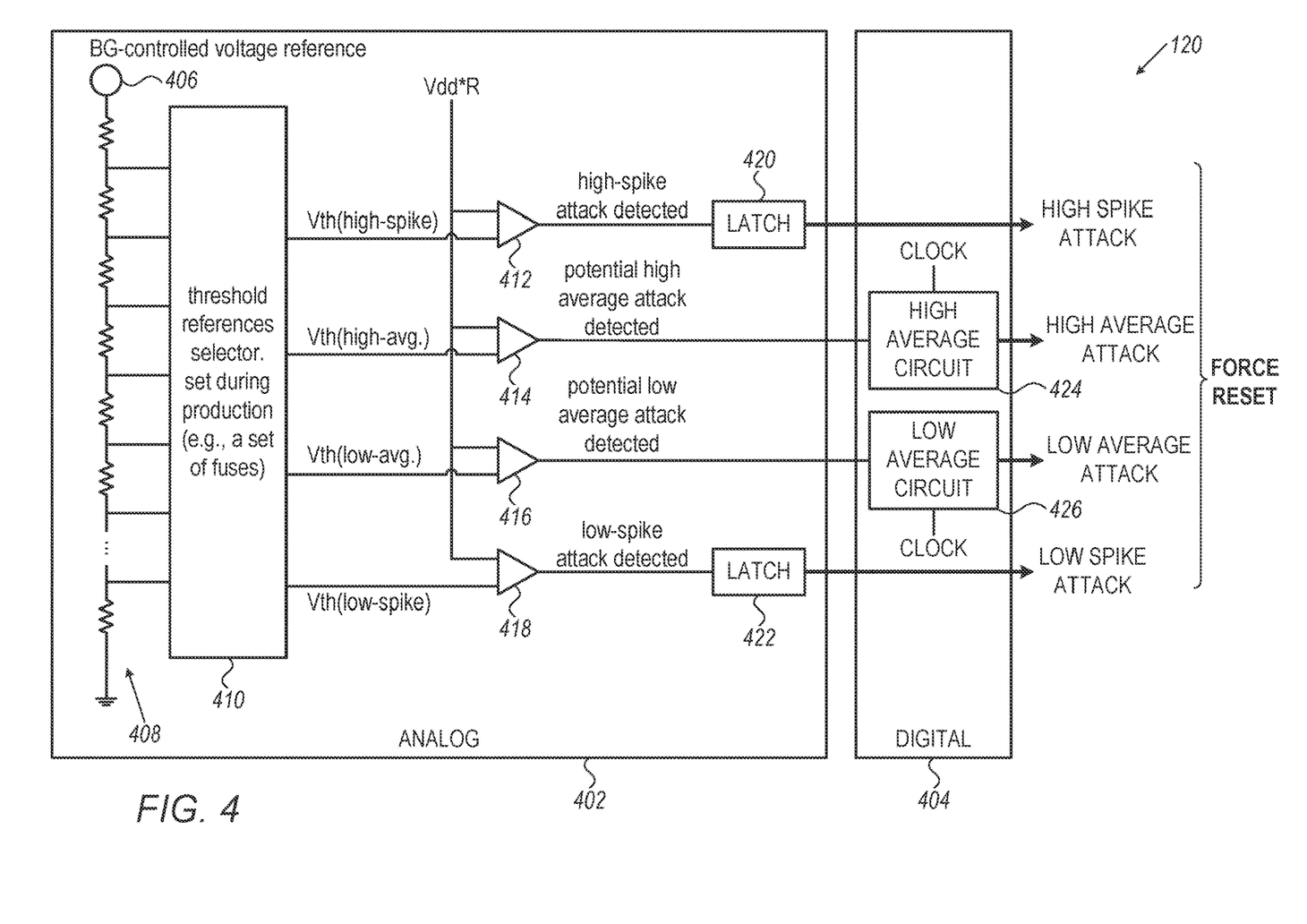
FIG. 4 is a block diagram that schematically illustrates the structure of an Attack-Protection Circuit (APC), in accordance with an embodiment of the present invention.

FIG. 4 is a block diagram that schematically illustrates the structure of an Attack-Protection Circuit (APC), in accordance with an embodiment of the present invention. APC 120 (which was defined with reference to FIG. 1) comprises an analog-domain circuit 402, and a digital-domain circuit 404. The analog circuit comprises a BandGap (BG)—controlled voltage reference 406, which is configured to generate a precise voltage (referred to as BG-V hereinbelow), and a resistor ladder 408, which is configured to generate a series of resistor-ladder voltages that are fractions of the BG-V. (BG-controlled voltage reference 406 is configured to output precise voltages in a wide range of its supply input.)

Analog circuit 402 further comprises a threshold selector 410, which is programmed during the manufacturing of IC 102 (e.g., as part of the production test) to select four of the resistor-ladder voltages. The four selected resistor-ladder voltages comprise comparison threshold voltages for the detection of a high-spike attack, a high-average attack, a low-average attack and a low spike attack.

Analog circuit 402 further comprises comparators, which compare the comparison threshold voltages that the threshold selector outputs, with Vdd multiplied by R. R is a fixed ratio, e.g., 0.5, generated by a resistor divider that is not shown; multiplication by R may be required because in practice the high Vdd thresholds required to identify an attack may be higher than BG-V and, hence, higher than any of the outputs of threshold selector 410. To avoid confusion, we refer to the threshold voltages that the threshold selector 410 outputs as comparison threshold voltages, which are typically smaller than the corresponding attack detection thresholds by the ratio R.

A comparator 412 compares the high spike comparison threshold, a comparator 414 compares the high average comparison threshold, a comparator 416 compares the low average comparison threshold and a comparator 418 compares the low-spike comparison threshold.

If the Vdd voltage exceeds a maximum-high-spike threshold, Vdd*R will be higher than the high-spike-comparison threshold voltage and comparator 412 will indicate that a high-spike attack is detected. Similarly, If the Vdd voltage is below a minimum-low-spike threshold, Vdd*R will be lower than the low-spike-comparison threshold voltage, and comparator 418 will indicate that a low-spike attack is detected. According to the example embodiment illustrated in FIG. 4, a Latch 420 will latch the detection of a high-spike attack, so that the indication will persist after the spike is removed. Similarly, a Latch 422 will latch the detection of a low spike attack, persisting after the spike is removed.

Latches 420 and 422 are configured to provide protection against a combined voltage—frequency attack—the latches are not clocked and retain the respective attack indications regardless of any spikes on the clock input, including stopping of the clock oscillations.

Comparator 414 indicates when Vdd exceeds the high-average threshold (or, more precisely, when Vdd*R exceeds average-high-comparison threshold). In embodiments, this is not considered an attack unless the average occurrence rate of the indication exceeds a preset value (in other words, the duty cycle of the pulses which indicate Vdd greater than average-high threshold exceeds the preset value). In some embodiments, a sliding average window is used, with a predefined window size and a predefined average threshold. Digital circuit 404 comprises a high average circuit 424, which is configured to average the duty cycle and to compare the duty cycle to a preset limit; if the preset limit is exceeded, high-average circuit 424 will indicate the detection of a high-average attacked.

Comparator 416 indicates when Vdd is below the low-average threshold. This may not be considered an attack unless the duty cycle of the pulse which indicates Vdd less than average-low threshold exceeds a preset value). Digital circuit 404 further comprises a low average circuit 426, which is configured to average the duty cycle and to compare the duty cycle to a preset limit; if the preset limit is exceeded, low-average circuit 426 will indicate the detection of a low-average attack.

According to the example embodiment illustrated in FIG. 4, when either latch 420, latch 422, high-average circuit 424 or low-average circuit 426 indicate that an attack has been detected, IC 102 resets. In embodiment, resetting of IC 102 also resets latches 420 and 422.

We will present a numerical example.
We assume:
Nominal Vdd=1.8V
Max Vdd=2.1V
Min Vdd=1.5V
high spike attack threshold=2.8V
high average attack threshold=2.4V
high average attack duty cycle threshold=90%.
low spike attack threshold=1.0V
low average attack threshold=1.2V
low average attack duty cycle threshold=90%
BG-V=2.0V
R=0.5

Since R=0.5, the comparison threshold voltages are ½ of the corresponding attack thresholds:
high spike comparison threshold=1.4V
high average comparison threshold=1.2V
low spike comparison threshold=0.5V
low average comparison threshold=0.6V we assume that the resistor ladder comprises 100 matched resistors, and hence the resistor ladder voltages are 0V, 20 mV, 40 mV, etc. Threshold selector 410 is programmed, during IC production test, to connect the voltage between resistor 25 and 26 (from the bottom) to the low average comparison threshold; connect the voltage between resistor 30 and 31 to low spike comparison threshold; connect the voltage between resistor 60 and 61 to high average comparison threshold; and, to connect the voltage between resistor 70 and 71 to high spike comparison threshold.

Thus, according to the example embodiment illustrated in FIG. 4 and described herein, an APC, comprising analog and digital domain circuit, can protect against the four types of voltage attacks, combined with frequency attacks.

As would be appreciated, the configuration of APC 120 illustrated in FIG. 4 and described herein is an example configuration that is cited for the sake of conceptual clarity. Other suitable configurations may be used in alternative embodiments. For example, in some embodiments, the resistor ladder is coupled to the Vdd, and the comparators compare preset fractions of Vdd to a fixed voltage level (e.g., to BG-ref*R). In some embodiments, APC 120 is configured to monitor and protect against attacks on a plurality of supply voltages.

Figure 5:
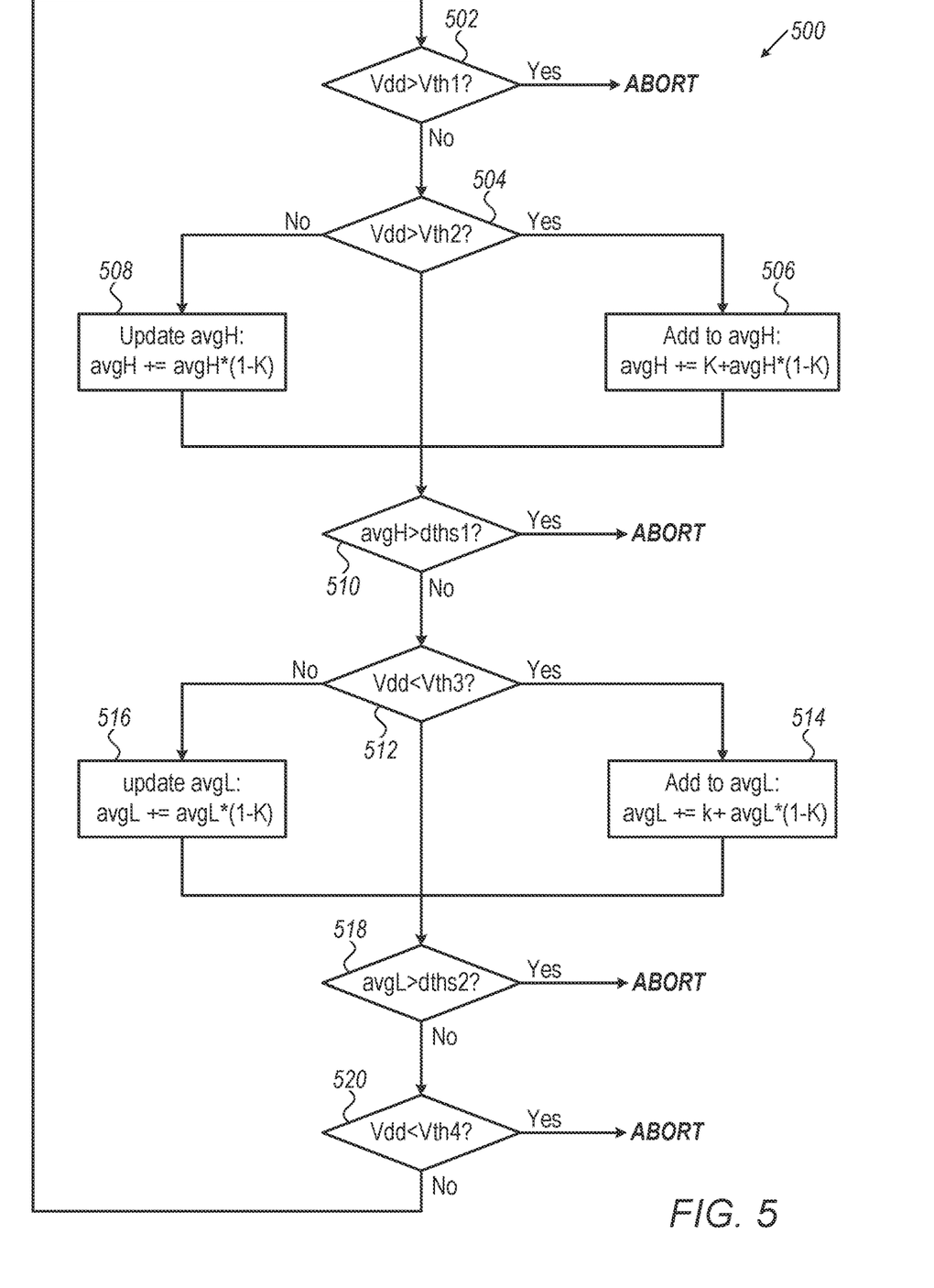
FIG. 5 is a flowchart that schematically illustrates a method for protecting an IC against voltage and against combined voltage-frequency attacks that applied to a Vdd supply input and to a clock input of the IC, in accordance with an embodiment of the present invention.

FIG. 5 is a flowchart that schematically illustrates a method 500 for protecting an IC against voltage and against combined voltage-frequency attacks that are applied to a Vdd supply input and to a clock input of the IC, in accordance with an embodiment of the present invention. The flowchart is executed by an Attack-Protection-Circuit (APC) (e.g., APC 120, FIG. 1). The flowchart refers to four voltage references—Vth1, Vth2, Vth3 and Vth4, wherein Vth1>Vth2>Vth3>Vth4. The four threshold voltages may be generated, for example, by a resistor ladder which divides a fixed voltage reference (e.g., BG-V 406, FIG. 4).

According to the example embodiment illustrated in FIG. 5, the averaging that is done to detect average high attack and average low attacks comprise infinite-impulse-response (IIR) filters:

$$AVG=(Vdd>\text{threshold?})AVG*(1-K)+K:AVG*(1-K).$$

(The equation cited above is for average-high.)

K is a decay constant less than 1 (e.g., K=0.02). As would be appreciated, other averaging methods may be used in alternative embodiments.

The flowchart starts at a Compare Vth1 step 502, wherein the APC compares the supply voltage Vdd to the highest threshold voltage Vth1. In an embodiment, Vth1 is selected so that, if a high-voltage-spike attack is attempted, Vdd will be higher than Vth1, and if Vdd>Vth1 the APC will abort (e.g., reset the functional circuitry of the IC). If, in step 502, Vdd is not greater than Vth1, the APC will enter a Compare Vth2 step 504, and compare Vdd to Vth2. In embodiments, Vth2 is selected so that, if Vdd>Vth2, a high average attack may be in progress. If, in step 504, Vdd is greater than Vth2, the APC will enter an Add-to-high-Average step 506, and update avgH value according to the formula:

$$avgH = K + avgH*(1-K)$$

if, in step 504, Vdd is not greater than Vth2, the APC will enter an Update-Average-high step 508, and update avgH value according to the formula:

$$avgH = avgH*(1-K).$$

After either step 506 or step 508, the APC will enter a compare-average-high step 510 and compare the value of avgH to a digital threshold dths1 (e.g., 0.95). If avgH is greater than dths1 the functional circuit of the IC will abort (e.g., reset).

If, in step 510, avgH is not greater than dths1, the APC will enter a Compare Vth3 step 512, and compare Vdd to Vth3. In embodiments, Vth3 is selected so that, if Vdd<: Vth3, a low average attack may be in progress. If, in step 512, Vdd is lower than Vth3, the APC will enter an Add-to-low-Average step 514, and update avgL value according to the formula:

$$avgL = K + avgL*(1-K)$$

if, in step 512, Vdd is not lower than Vth3, the APC will enter an Update-Average-Low step 516, and update avgL value according to the formula:

$$avgL = avgL*(1-K).$$

After either step 514 or step 516, the APC will enter a compare-average-low step 518 and compare the value of avgL to a digital threshold dths2 (e.g., 0.95). If avgL is greater than dths2 the functional circuit of the IC will abort (e.g., reset).

If, in step 518, avgL is not higher than dths2, the APC enters a Compare-vth4 step 520, wherein the APC compares the supply voltage Vdd to the lowest threshold voltage Vth4. In an embodiment, Vth4 is selected so that, if a low-voltage-spike attack is attempted, Vdd will be lower than Vth4, and hence, if at step 520 Vdd<Vth4, the APC will abort.

As would be appreciated, the flowchart illustrated in FIG. 5 is an embodiment that is cited by way of example. Other flowcharts may be used in alternative embodiments. For example, in some embodiment, a sliding window averaging is done, rather than an IIR-based averaging. In an embodiment, all or some of the comparisons to Vth steps 502, 504, 512 and 520 may be done concurrently. The IIR averaging may be replaced by any other suitable averaging technique, and different averaging techniques may be used for average-high and average-low.

The configurations of attack scenario 100, IC 102 and APC 120, state-diagram 250 and flowchart 500, illustrated in FIGS. 1 through 5 and described hereinabove, are example configurations, state-diagrams and flowcharts that are shown purely for the sake of conceptual clarity. Any other suitable configurations, state-diagrams and flowcharts can be used in alternative embodiments. The different sub-units of IC 102 may be implemented using suitable hardware, such as in one or more Application-Specific Integrated Circuits (ASICs) or Field-Programmable Gate Arrays (FPGAs), using software, using hardware, or using a combination of hardware and software elements.

It will thus be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. An Integrated Circuit (IC), comprising:
circuitry, to receive a supply voltage from a power-supply input; and
attack-protection circuitry (APC), which is coupled to the power-supply input and comprises:
a front-end circuit, to compare the supply voltage to a plurality of voltage thresholds, and to output a respective plurality of indications that indicate whether the supply voltage violates the respective voltage thresholds; and
an averaging circuit, to estimate, for one or more of the indications, one or more respective duty-cycles at which the one or more indications exceed the respective voltage thresholds,
wherein the APC is to trigger one or more attack detection events in response to the indications and the duty-cycles.

2. The IC according to claim 1, wherein the front-end circuit is an analog circuit, and the averaging circuit is a digital circuit.

3. The IC according to claim 1, wherein the APC is to latch the one or more attack detection events.

4. The IC according to claim 1, wherein the voltage thresholds comprise at least two different over-voltage thresholds.

5. The IC according to claim 1, wherein the voltage thresholds comprise at least two different under-voltage thresholds.

6. The IC according to claim 1, wherein the APC is to compare at least one of the duty cycles to a duty-cycle threshold, and to trigger an attack detection event in response to detecting that the duty-cycle threshold is exceeded.

7. The IC according to claim 1, wherein the APC is to trigger at least one of the attack detection events irrespective of whether a clock signal of the IC is operative.

8. The IC according to claim 1, wherein the front-end circuit comprises a resistor network for generating the plurality of voltage thresholds.

9. A method for protecting an Integrated Circuit (IC), the method comprising:
- using a front-end circuit, comparing a supply voltage, which is supplied to circuitry of the IC, to a plurality of voltage thresholds, and outputting a respective plurality of indications that indicate whether the supply voltage violates the respective voltage thresholds;
- using an averaging circuit, estimating, for one or more of the indications, one or more respective duty-cycles at which the one or more indications exceed the respective voltage thresholds; and
- triggering one or more attack detection events in response to the indications and the duty-cycles.

10. The method according to claim 9, wherein the front-end circuit is an analog circuit, and the averaging circuit is a digital circuit.

11. The method according to claim 9, wherein triggering the attack detection events comprises latching the one or more attack detection events.

12. The method according to claim 9, wherein the voltage thresholds comprise at least two different over-voltage thresholds.

13. The method according to claim 9, wherein the voltage thresholds comprise at least two different under-voltage thresholds.

14. The method according to claim 9, wherein triggering the attack detection events comprises comparing at least one of the duty cycles to a duty-cycle threshold, and triggering an attack detection event in response to detecting that the duty-cycle threshold is exceeded.

15. The method according to claim 9, wherein triggering the attack detection events comprises triggering at least one of the attack detection events irrespective of whether a clock signal of the IC is operative.

16. The method according to claim 9, and comprising generating the plurality of voltage thresholds in the front-end circuit using a resistor network.

17. A method for protecting an Integrated Circuit (IC), the method comprising:
- comparing a supply voltage supplied to circuitry of the IC to a plurality of voltage thresholds;
- outputting a respective plurality of indications that indicate whether the supply voltage violates the respective voltage thresholds;
- estimating, for one or more of the indications, one or more respective duty-cycles at which the one or more indications exceed the respective voltage thresholds; and
- triggering one or more attack detection events in response to the indications and the duty-cycles.

* * * * *